(12) United States Patent
Ackermann et al.

(10) Patent No.: US 11,109,470 B2
(45) Date of Patent: Aug. 31, 2021

(54) TUBULAR LIGHTING DEVICE, LUMINAIRE AND METHOD FOR OPERATING WITH AN ELECTRONIC BALLAST

(71) Applicant: SIGNIFY HOLDING B.V., Eindhoven (NL)

(72) Inventors: Bernd Ackermann, Aachen (DE); Theodorus Johannes Petrus Van Den Biggelaar, Veldhoven (NL); Pieter Johannes Stobbelaar, Eindhoven (NL); Haimin Tao, Eindhoven (NL); Henricus Theodorus Van Der Zanden, Sint-Oedenrode (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 39 days.

(21) Appl. No.: 16/632,892

(22) PCT Filed: Jul. 16, 2018

(86) PCT No.: PCT/EP2018/069223
§ 371 (c)(1),
(2) Date: Jan. 22, 2020

(87) PCT Pub. No.: WO2019/020415
PCT Pub. Date: Jan. 31, 2019

(65) Prior Publication Data
US 2020/0214107 A1 Jul. 2, 2020

(30) Foreign Application Priority Data
Jul. 25, 2017 (EP) .................................. 17183012

(51) Int. Cl.
*H05B 45/3578* (2020.01)
*H05B 45/3725* (2020.01)
(Continued)

(52) U.S. Cl.
CPC ............ *H05B 47/19* (2020.01); *F21K 9/278* (2016.08); *H02J 7/00032* (2020.01);
(Continued)

(58) Field of Classification Search
None
See application file for complete search history.

(56) References Cited

U.S. PATENT DOCUMENTS 7,417,556 B2 8/2008 Ling
7,946,725 B2 5/2011 Waffenschmidt et al.
(Continued)

FOREIGN PATENT DOCUMENTS

EP 1915890 B1 12/2011
WO 2012110973 A1 8/2012
(Continued)

*Primary Examiner* — Anh Q Tran
(74) *Attorney, Agent, or Firm* — Daniel J. Piotrowski

(57) ABSTRACT

A retrofit tubular lighting device (7), comprising first (p1, p2) and second connection pins (p3, p4), a first (12) and second filament emulation circuit (13) coupled to the first (p1, p2) and second connection pins (p3, p4) respectively, a lighting element (4), a driver (3) coupled to the first (12) and second filament emulation circuit (13), a battery (5) and the lighting element (4). The driver (3) provides a charge to the lighting element (4) and the battery (5). The battery (5) stores the charge provided by the driver (3) and provides charge to the lighting element (4). A communication device sends a first charging signal to another lighting device comprising a further battery and coupled to the electronic ballast, when the charge of the battery (5) is below a first threshold. The communication device receives a second charging signal from the other lighting device, wherein the second charging signal indicates that a further charge of the further battery is below a second threshold. At least one of the first and second filament emulation circuit provides
(Continued)

power from the electronic ballast (2) to the driver (3) when the communication device receives the second charging signal.

11 Claims, 4 Drawing Sheets

(51) Int. Cl.
    *H05B 47/19*     (2020.01)
    *F21K 9/278*     (2016.01)
    *H02J 7/00*     (2006.01)
    *H05B 45/39*     (2020.01)

(52) U.S. Cl.
    CPC .......... *H02J 7/0048* (2020.01); *H02J 7/0068* (2013.01); *H05B 45/3578* (2020.01); *H05B 45/39* (2020.01); *H05B 45/3725* (2020.01)

(56) References Cited

U.S. PATENT DOCUMENTS

| | | | |
|---|---|---|---|
| 8,190,096 | B2 | 5/2012 | Rutjes et al. |
| 8,570,221 | B2 | 10/2013 | Bao et al. |
| 9,516,706 | B2 | 12/2016 | Shan |
| 2013/0328402 | A1* | 12/2013 | Noguchi ................. F21S 9/022 |
| | | | 307/66 |
| 2014/0203717 | A1* | 7/2014 | Zhang ................ H05B 45/3578 |
| | | | 315/188 |
| 2017/0311396 | A1 | 10/2017 | Sadwick |
| 2020/0113033 | A1* | 4/2020 | Ramaiah ............... F21V 23/003 |

FOREIGN PATENT DOCUMENTS

| | | |
|---|---|---|
| WO | 2017036848 A1 | 3/2017 |
| WO | 2017036998 A1 | 3/2017 |

\* cited by examiner

TUBULAR LIGHTING DEVICE, LUMINAIRE AND METHOD FOR OPERATING WITH AN ELECTRONIC BALLAST

CROSS-REFERENCE TO PRIOR APPLICATIONS

This application is the U.S. National Phase application under 35 U.S.C. § 371 of International Application No. PCT/EP2018/069223, filed on Jul. 16, 2018, which claims the benefit of European Patent Application No. 17183012.8, filed on Jul. 25, 2017. These applications are hereby incorporated by reference herein.

FIELD OF THE INVENTION

The invention relates to a tubular lighting device for operating with an electronic ballast. The invention further relates to a luminaire comprising the tubular lighting device and the electronic ballast. The invention further relates to a method for operating a retrofit tubular lighting device.

BACKGROUND OF THE INVENTION

Tubular fluorescent tubes are widely used in office and manufacturing environments. These tubes can be driven by several types of ballast such as electromagnetic ballasts and electronic ballasts.

Tubular fluorescent tubes are nowadays being replaced by new modern lighting tubes. The lighting tubes may comprise an LED lighting unit that has an improved lumen efficacy over the conventional fluorescent tubes. These new lighting tubes are equipped with a battery or any kind of energy storage device for improved performance of the lighting tube. Examples of improved performance may be added functionality like improved stand-by functionality like additional communication opportunities but also operation as emergency lighting where the energy storage provides power when the mains is not present. Furthermore, an energy storage can improve the compatibility between and the energy efficiency of the lighting tube and an electronic ballast.

WO 2017/036998 discloses a first lamp for use in a luminaire, the first lamp comprising: a transmitting circuit configured to transmit, and/or a receiving circuit configured to receive, one or more signals via a constrained signaling channel whereby propagation of the signals is constrained by a physical characteristic of the luminaire; and a controller configured to detect, based on the transmission and/or reception of these one or more signals via the constrained signaling channel, that one or more other, second lamp are present in the same luminaire as the first lamp, and to identify the one or more second lamps based on the transmission and/or reception of the one or more signals.

An electronic ballast may be arranged to drive two fluorescent tubes coupled in series or in parallel. When the fluorescent tubes are replaced by retrofit tubular lighting devices, the power drawn by the two retrofit tubular lighting devices is not enough to ensure that the electronic ballast operates in its optimum operating range. Therefore, the electronic ballast will have a reduced power efficiency when retrofit tubular lighting devices are coupled to the electronic ballast.

SUMMARY OF THE INVENTION

It is an objective of the invention to provide a retrofit tubular lighting device that is arranged to allow the electronic ballast to operate in its optimum operating range.

To overcome this concern, in a first aspect of the invention, a retrofit tubular lighting device for operating with an electronic ballast is provided, wherein the electronic ballast is arranged to supply a plurality of fluorescent lamps, the tubular lighting device comprising:

first connection pins for coupling to a first output of the electronic ballast;
second connection pins for coupling to a second output of the electronic ballast;
a first filament emulation circuit coupled to the first connection pins;
a second filament emulation circuit coupled to the second connection pins;
a lighting element;
a driver coupled to the first filament emulation circuit, the second emulation circuit, a battery and the lighting element, wherein the driver is arranged to provide a charge to the lighting element and the battery;
the battery for storing the charge provided by the driver and providing the charge to the lighting element;
a communication device for sending a first charging signal to another retrofit tubular lighting device comprising a further battery and being coupled to the electronic ballast, when the charge of the battery is below a first threshold, and wherein the communication device is further arranged for receiving a second charging signal from the other retrofit tubular lighting device, wherein the second charging signal indicates that a further charge of the further battery is below a second threshold,
wherein at least one of the first filament emulation circuit and the second filament emulation circuit is arranged to provide power from the electronic ballast to the driver when the communication device receives the second charging signal indicating that the further charge of the further battery is below the second threshold.

The effect of the retrofit tubular lighting device being configured as claimed allows communicating with another retrofit tubular lighting device, which is useful when one of the two retrofit tubular lighting devices needs to recharge its battery. The charging of the battery can be done by drawing power that is in the range of the optimum power range of the electronic ballast. Since both retrofit tubular lighting devices have to be able to receive power from the electronic ballast, the retrofit tubular lighting devices need to communicate with each other to signal that recharging is required and that the other lamp needs to make sure he can receive power from the electronic ballast. This will allow the electronic ballast to start up and start providing power to at least the retrofit tubular lighting device that needs to charge its battery. Without any communication between the retrofit tubular lighting devices, the ballast would not start up since one of the retrofit tubular lighting devices would not allow power to be received from the electronic ballast, keeping the ballast in a stand-by mode.

In a further example, the retrofit tubular lighting device is further arranged for sending a first discharging signal to the other retrofit tubular lighting device, when the battery charge is above a third threshold, and wherein the communication device is further arranged for receiving a second discharging signal from the other retrofit tubular lighting device, wherein the second discharging signal indicates that the further charge of the further battery is above a fourth threshold, wherein at least one of the first filament emulation circuit and the second filament emulation circuit is arranged to prevent power to be provided from the electronic ballast to the driver when the communication device receives the second charging signal.

This gives the retrofit tubular lighting devices an indication on when they can stop allowing power to be supplied from the electronic ballast to the retrofit tubular lighting devices. This allows the electronic ballast to go into stand-by and reduces the power dissipation in the electronic ballast.

In another example, the retrofit tubular lighting device comprises the first filament emulation circuit and the second filament emulation circuit that are arranged to:

block power to flow from the electronic ballast to the driver when the communication device receives the second discharging signal and the battery charge is above the first threshold, provide power from the electronic ballast to the driver when the communication device receives the second charging signal or the battery charge is below the second threshold.

The filament emulation circuits that are normally used to allow the electronic ballast to operate can further be used to block power and provide power from the electronic ballast based on the charge of the battery in the retrofit tubular lighting device or the further battery in the further retrofit tubular lighting device.

In a further example, the first filament emulation circuit and the second filament emulation circuit comprise switches for blocking the power to flow from the electronic ballast to the driver.

The switches allow the filament circuit to actively switch between blocking power and providing power to be delivered by the electronic ballast.

In a further example, the communication device is a wireless communication device.

By having a wireless communication device, the retrofit tubular lighting device can easily communicate with the other retrofit tubular lighting device without having to make other modifications in the luminaire.

In a further example, the retrofit tubular device further comprises a further switch coupled between the first filament emulation circuit and the second filament emulation circuit, wherein the further switch is opened to cause the electronic ballast to go into stand-by.

By having the further switch opened, no power can be supplied to the driver. This will cause the ballast to go into a stand-by mode wherein the ballast consumes a low amount of power.

In a further example, the switches in both the filament emulation circuits are opened to reset the electronic ballast and the switches in both the filament emulation circuits are closed followed by closing the further switch to allow the electronic ballast to provide power to retrofit tubular lighting device.

Switching the switches in this sequence is known to emulate a lamp removal situation wherein the ballast stops providing power when a lamp is removed and starts providing power again when the lamp/or another lamp is inserted back in the socket. This is a well-known method of emulation a lamp removal situation, which is described in detail in the European patent application 17158032.7.

In a further example, the lighting element in the retrofit tubular lighting device is an LED lighting element.

In another example, a luminaire is provided comprising
an electronic ballast arranged to supply power to a plurality of fluorescent lamps;
a plurality of retrofit tubular lighting devices according to any of the preceding claims, wherein the communication device in each of the retrofit tubular lighting devices is arranged to communicate with another communication device of another of the plurality of tubular lighting devices.

In a further example, a method for operating a retrofit tubular lighting device is provided comprising the steps of:

sending a first charging signal to another retrofit tubular lighting device comprising a further battery and being coupled to the electronic ballast when the charge of the battery is below a first threshold;

receiving a second charging signal from the other retrofit tubular lighting device, wherein the second charging signal indicates that a further charge of the further battery is below a second threshold;

allow power to be provided form the electronic ballast to the driver when the communication device receives the second charging signal.

In a further example, a method is provided comprising the additional steps of:

sending a first discharging signal to the other retrofit tubular lighting device when the battery charge is above a third threshold;

receiving a second discharging signal from the other retrofit tubular lighting device, wherein the second discharging signal indicates that the further charge of the further battery is above a fourth threshold.

BRIEF DESCRIPTION OF THE DRAWINGS

Examples of the invention will now be described with reference to the accompanying drawings, in which.

DETAILED DESCRIPTION OF THE EMBODIMENTS

Figure 1:
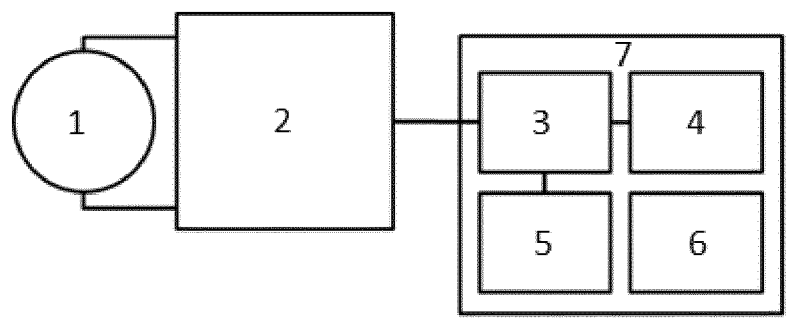
FIG. 1 shows an example of a fluorescent LED retrofit lamp coupled to an external device.

FIG. 1 shows an example of a retrofit tubular lighting device 7. The retrofit tubular lighting device 7 is coupled to an external device 2 such as a ballast for driving fluorescent lamps. A power converter 3 receives an input power provided by the external device 2. The power converter can provide power to the battery 5 when the battery 5 needs to be charged. The power converter 3 can furthermore provide power to the load 4. In this example, the load 4 is an LED load. A lamp controller 6 controls the power converter 3. The lamp controller 6 may comprise a wired or wireless transceiver. This allows the lamp controller 6 to send and receive control signals. These signals can be communicated between the retrofit lamp and an external controller. The control signal may comprise commands such as to turn on the load 4 or to dim the load 4. As proposed in the invention, the control signal may also comprise additional commands as will be elaborated further on at the description of FIG. 3.

Figure 2:
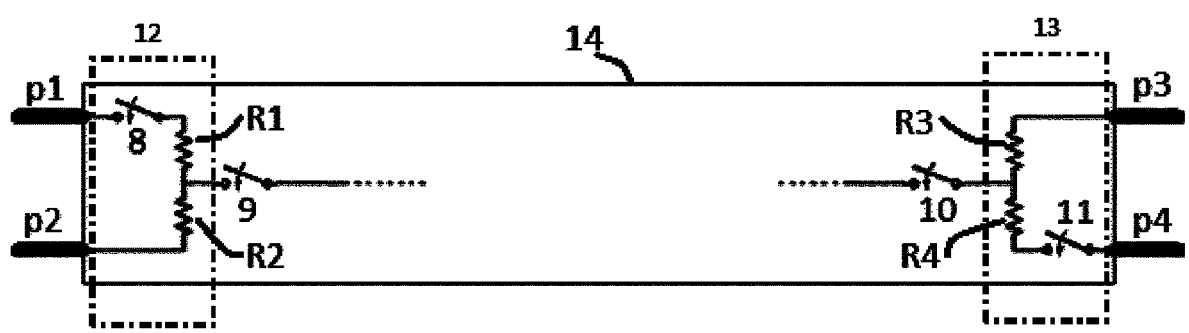
FIG. 2 shows an embodiment of a filament emulation circuit of a retrofit lamp.

FIG. 2 shows an embodiment of a retrofit tubular lighting device 7 according to FIG. 1. The retrofit tubular lighting device 7 is electrically coupled to the external device 2 as depicted in FIG. 1. In this embodiment, the external device 2 is an electronic ballast that receives power from an external AC power source 1, and supplies power to the lighting device 7 via the connection pins p1, p2, p3 and p4. The connection pins p1 and p2 are placed on one end of an elongated tube 14 and the pins p3 and p4 are placed at the other end of the elongated tube 14. For an electronic ballast 2 to operate as desired, it is important that a filament current can flow from p1 to p2 and from p3 to p4. For fluorescent lamps, this filament current is used for preheating the filament before the gas discharge occurs but it can also be used for the ballast to determine the amount of output power that is required for the fluorescent lamp. Resistors R1, R2, R3 and R4 can be used to tune the filament current such that the electronic ballast 2 senses that the filaments of a fluorescent lamp are present. The first filament emulation circuit 12 may be a configuration of a series connection of a resistor R1, R2 and a switch 8 between the pins p1 and p2. The second filament emulation circuit 13 may be a configuration of a series connection of a resistor R3, R4 and a switch 8 between the pins p3 and p4. When the electronic ballast 2 senses that the filament emulation circuits 12 and 13 are present, the electronic ballast 2 will provide an ignition voltage between the two filament emulation circuits 12 and 13. For fluorescent lamps, this ignition voltage is used to ignite the gas in the elongated tube 14. When the ignition phase is done, the ballast will provide a constant current for its load. For the retrofit tubular lighting device 7, this ignition voltage and constant current are provided to the driver 3 and further to the load 4, the battery 5 and the lamp controller 6. Switches 9 and 10 can be opened to prevent the ignition voltage and the current to be applied to the driver 3 as shown in FIG. 1. Switch 8 is part of the first filament emulation circuit 12 and switch 11 is part of the second filament emulation circuit 13. In case the electronic ballast 2 should not provide power to the retrofit tubular lighting device 7, because the retrofit tubular lighting device 7 does not require any power since it is turned off or the battery 5 provides power to the load 4, the switches 8, 9, 10 and 11 can be arranged such that they prevent power to flow from the ballast to the retrofit tubular lighting device 7. The switches 8, 9, 10 and 11 are controlled by the lamp controller 6. Switch 8 prevents power to flow through the first filament emulation circuit 12 and switch 11 prevents power to flow through the second filament emulation circuit 13. Furthermore, a switch 9 or 10 prevents power to flow from the first filament emulation circuit 12 to the second filament emulation circuit 13. The switches may also be controlled to ensure that the ballast goes into stand-by when the retrofit tubular lighting device 7 requires no power and that the ballast can start up again in a normal fashion. This can be done by opening one of the switches 9 and 10. This will cause the electronic ballast to go into the off-mode where no power is provided to the retrofit tubular lighting device 7. The ballast will have only a low stand-by power consumption in this standby mode. Opening the switches 8 and 11 resets the electronic ballast 2 and closing the switches 8 and 11 again followed by the closing the switches 9 and 10, allows the ballast to be turned on again and allows power to be provided to the retrofit tubular lighting device 7. This switching and interaction of the retrofit tubular lighting device 7 with the electronic ballast 2 is elaborated in more depth in the European patent application 17158032.7. If the ballast would not be able to go into stand-by due to for example the switches 8, 9, 10 and 11 being all closed, but instead delivers a very small power to the retrofit tubular lighting device 7, the ballast itself will dissipate a large amount of energy, which will reduce the overall efficiency of the system.

The driver 3, the load, 4, the battery 5 and the lamp controller 6 may be coupled between the switches 9 and 10. The driver 3 receives power from the electronic ballast 2 via the first filament emulation circuit 12 and the second filament emulation circuit 13. The driver 3 provides power to the load 4 and the battery 5. The driver 3 may also provide power to the lamp.

Figure 3:
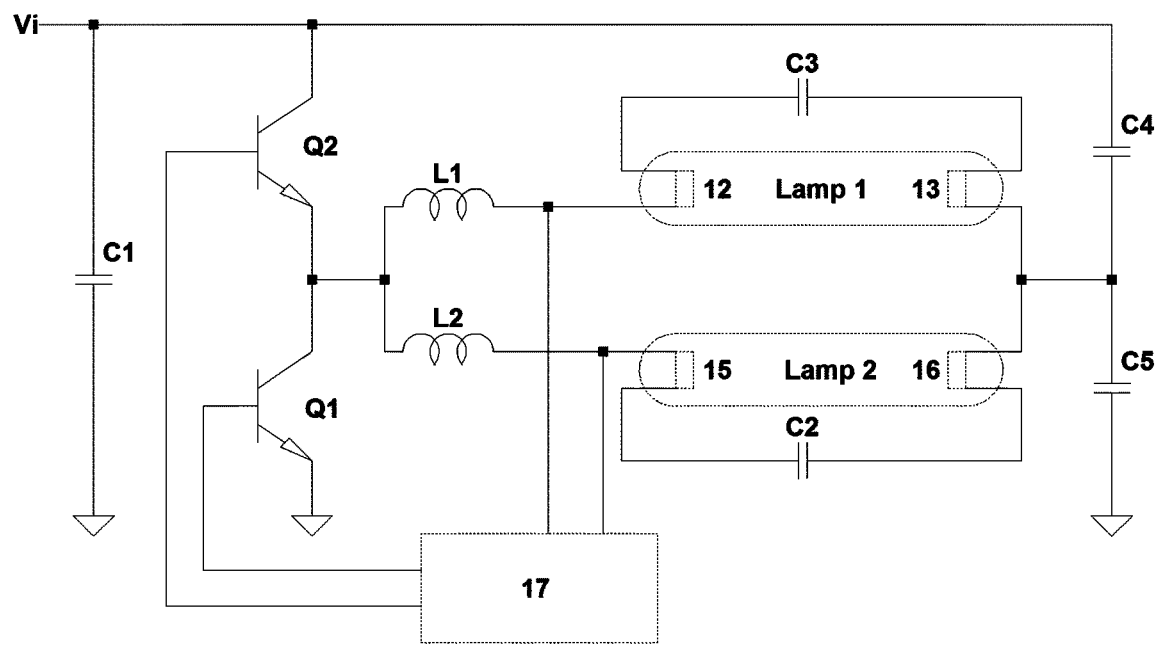
FIG. 3 shows a circuit of an electronic ballast that can drive two fluorescent lamps coupled in parallel.

FIG. 3 shows a circuit of an electronic ballast 2 that drives two retrofit tubular lighting devices 7, Lamp 1 and Lamp 2, coupled in parallel. The electronic ballast is in this example a half bridge resonant converter. The switches Q1 and Q2, coupled in series between the input voltage Vi and the return, form the half bridge with an output node between the switches Q1 and Q2. The output node is coupled to two resonant tanks consisting of the inductor L1 and capacitor C3 for the first resonant tank and L2 and capacitor C2 for the second resonant tank. Lamp 1 and lamp 2 are in this example coupled between the inductors L1, L2 and the capacitors C4 and C5. Capacitor C1 is used as a smoothing and energy storing capacitor for stabilizing the received input voltage Vi. Vi may be a rectified AC input voltage coming from the external AC power source 1. The capacitors C4 and C5 are part of the electronic ballast 2 and are placed in series between one end of Lamp 1 and Lamp 2 and the return path for capacitor C5 and the input voltage Vi for capacitor C4 respectively to split the input voltage Vi. The controller 17 controls the two switches Q1 and Q2 of the electronic ballast 2 and allows the electronic ballast 2 to provide power to the retrofit tubular lighting devices Lamp 1 and Lamp 2. When the fluorescent lamps are replaced by retrofit tubular lighting devices, the power supplied to the retrofit tubular lighting devices may become that low that the controller 17 is unable to stably control the two switches Q1 and Q2. The reason is that the current through the resonant inductor L1, L2 is also re-used as the control signals for driving the switches Q1 and Q2. When the current to the load is too low, the current to the base of the switches Q1 and Q2 will also be too low and therefore the switches Q1 and Q2 cannot be controlled adequately. In this example, the electronic ballast 2 is described as a self-oscillating ballast. The ballast may also be an IC controlled electronic ballast 2. At low powers, the controller 17 might shut down the ballast if the ballast becomes too unstable or may keep the ballast operating resulting in an increase in power losses in the ballast or audible noise caused by the unstable behavior. One way to solve this is to draw more power from the ballast such that the ballast can operate in its normal, and more efficient, operating range. However, the retrofit tubular lighting device 7 does not require such a high amount of power. A solution is to store the excess of power in a battery or other energy storage element 5. When the battery 5 is fully charged, the retrofit tubular lighting device 7 is unable to draw enough power to enable the ballast to operate in its normal operation range. Therefore, the retrofit tubular lighting device 7 needs to prevent power to be supplied by switching the switches 8, 9, 10 and 11, as shown in FIG. 2, such that the retrofit tubular lighting device 7 is unable to receive any power from the ballast. Although the switches 8, 9, 10 and 11 are not explicitly shown in FIG. 3, they are present in both lamps Lamp 1 and Lamp 2 as is shown in the lamp of FIG. 2. Both a controller 6 and a battery 5, as shown in FIG. 1, are associated with each one of the lamps Lamp 1 and Lamp 2. An example of such a configuration is one wherein the switches 8, 9, 10 and 11, as shown in FIG. 2, are all open but another option has already been given in the description of FIG. 2. The main aspect is that it is ensured that no power can be supplied to the retrofit tubular lighting devices. The battery 5 now serves at least two purposes, namely the first purpose is to maintain the supply of power to the load 4 and the second purpose is to keep the switches 8, 9, 10 and 11 in their configured state, as described above, such that they prevent the power to flow from the ballast to the retrofit tubular lighting device 7. When the stored charge in the battery 5 reaches a lower threshold, meaning there is almost not enough charge left in the battery 5, the lamp controller 6 configures the switches 8, 9, 10 and 11 such that power can start flowing from the ballast to the retrofit tubular lighting device 7. This switching can be done as is proposed in the description of FIG. 2 but it can be any kind of switching configuration that allows power to flow from the ballast to the retrofit tubular lighting devices.

When two retrofit tubular lighting devices are placed in parallel and coupled with one ballast, it can occur that one retrofit tubular lighting device 7 has a battery 5 that has sufficient charge while the second retrofit tubular lighting device 7 has a battery that has a charge level that reached the lower threshold. Therefore, the second retrofit tubular lighting device 7 will arrange its switches such that power can flow from the ballast to the second tubular lighting device 7. However, since only one of the two tubular lighting devices is now capable of receiving power, the controller 17 detects that the other one is still not connected and will therefore prevent the ballast to deliver power. It is therefore required that both tubular lighting devices can receive power from the ballast. So, even when the battery 5 in the first tubular lighting device 7 does not need to be charged, the first tubular lighting device 7 will open and close its switches 8 and 11, followed by closing the switches 9 and 10, such that the first tubular lighting device 7 can receive power and the controller 17 senses that both tubular lighting devices can receive power from the ballast. This sensing can be done by detecting if all filaments are capable of conducting a current indicating that all lamps are placed in the luminaire. The controller 17 will then allow power to be delivered from the ballast to the tubular lighting devices.

A communication, of charge levels of the battery 5 in each of Lamp 1 and Lamp 2, between Lamp 1 and the Lamp 2 allows both lamps to receive power from the ballast such that at least one of the tubular lighting devices can charge its battery 5. To allow the first tubular lighting device 7 to communicate with the second tubular lighting device, the lamp control 6 of each lamp Lamp 1 and Lamp 2 is equipped with a transceiver. The communication can be done wired or wireless.

Disconnection of the power supplied to a tubular lighting device 7 is in this example described wherein the tubular lighting device 7 still provides power from the battery 5 to the load 4. However, the tubular lighting devices can also both be turned off and the battery 5 needs to provide power for the lamp control 6 and not the load 4, meaning both Lamp 1 and Lamp 2 are in stand-by mode. It may happen that one of the lamps is still operating so half of the light output will be generated, which can be useful for dimming operation. In this situation, it is preferred to power that single lamp which is on from its battery 5 so the electronic ballast 2 stays in the stand-by mode and does not have to operate outside its nominal operating range.

In another situation, it is also possible that both tubular lighting devices are in stand-by mode. The tubular lighting devices only require a stand-by power that can be provided by the batteries 5 while the electronic ballast 2 stays in the stand-by mode and does not have to operate outside its nominal operating range.

Figure 4:
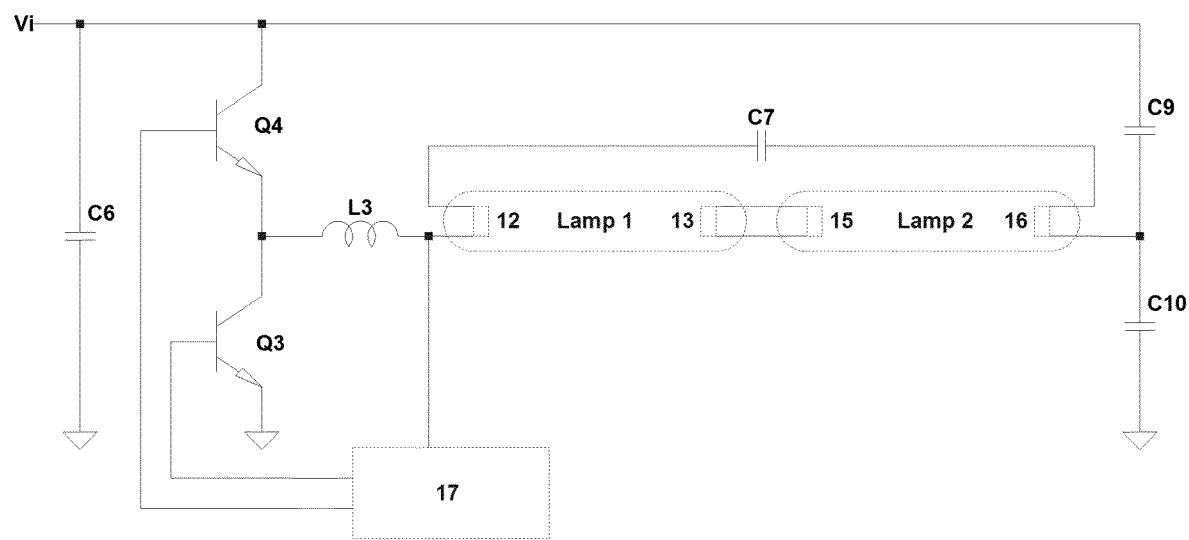
FIG. 4 shows a circuit of an electronic ballast that can drive two fluorescent lamps coupled in series.

FIG. 4 shows a circuit of an electronic ballast 2 that drives two retrofit tubular lighting devices Lamp 1 and Lamp 2 coupled in series. The electronic ballast is in this example a half bridge resonant converter. The switches Q3 and Q4, coupled in series between the input voltage Vi and the return, form the half bridge with an output node between the switches Q3 and Q4. The output node is coupled to the resonant tank consisting of the inductors L3 and the capacitors C7. In this example, Lamp 1 and Lamp 2 are coupled between the inductor L3 and the capacitors C9 and C10. Capacitor C6 is used as a smoothing and energy storing capacitor for stabilizing the received input voltage Vi. Vi may be a rectified AC input voltage coming from the external AC power source 1. The capacitors C4 and C5 are part of the electronic ballast 2 and are placed in series between one end of Lamp 2 and the return path for capacitor C10 and the input voltage Vi for capacitor C9 respectively to split the input voltage Vi. The controller 17 controls the two switches Q3 and Q4 of the electronic ballast 2 and allows the electronic ballast 2 to provide power to the retrofit tubular lighting devices Lamp 1 and Lamp 2. Similar to the situation wherein the retrofit tubular lighting devices are coupled in parallel, both retrofit tubular lighting devices have to be able to receive power from the electronic ballast 2 simultaneously. When one of the retrofit tubular lighting devices does not allow power to flow, the electronic ballast 2 will not provide power to the retrofit tubular lighting devices. The electronic ballast 2 has the same behavior as the electronic ballast 2 shown in FIG. 3. Therefore, the switching behavior of the switches inside Lamp 1 and Lamp 2 may be similar to that as described in the description of FIG. 3.

When the second tubular lighting device has sent a charging signal to the first tubular lighting device 7, both tubular lighting devices arrange their switches 8, 9, 10, 11 (not explicitly shown in FIG. 4, but arranged in the tubular lighting devices as depicted in FIG. 2), as similar to the situation wherein Lamp 1 and Lamp 2 are coupled in parallel and as described in the description of FIG. 2, to allow power to be delivered by the ballast. When the battery in the second tubular lighting device has reached an upper threshold level, indicating that the battery is sufficiently charged, the second tubular lighting device sends a discharging signal to the first tubular lighting device indicating that the charging of the battery of the second tubular lighting device is finished. This results that both the tubular lighting devices configure their switches to prevent power to be delivered to the tubular lighting devices.

Optionally, in all embodiments, Lamp 1 can send a discharging signal back to the second tubular lighting device Lamp 2 to indicate that both tubular lighting devices are ready to arrange their switches to prevent power to be delivered from the ballast to the tubular lighting devices.

Optionally, in all embodiments, the resistors R1, R2, R3 and R4 can be replaced or augmented with reactive components such as capacitors and inductors to further improve the filament emulation circuit behavior with respect to efficiency and compatibility with the external device 2.

Optionally, in all embodiments, the load 4 can be, but not limited to, any of an LED load, laser lighting, or any sensors requiring electric power such as PIR, light or temperature sensors.

Furthermore, the driver of the electronic ballast 2 may be any kind of driver known in the prior art. Preferably, the driver is a switched mode power supple such as, but not limited to, a boost converter, a buck converter, a flyback converter, a resonant converter or a SEPIC, single-ended-primary-inductor-converter.

It should be noted that all examples show two switches, 9 and 10, to open the conductive path between the first filament emulation circuit 12 and the second emulation circuit 13. However, a single switch suffices to ensure that the conductive path between the first and second filament emulation circuits can be opened.

Optionally, in all embodiments as described by the appended claims, the energy storage device 5 is one of, but not limited to, a battery, a supercapacitor or a fuel cell or any kind of mechanical storage device. The energy storage device may be placed in the retrofit tubular lighting device, inside a luminaire or even outside the luminaire where it might for example be mounted in a ceiling.

The invention claimed is:

1. A retrofit tubular lighting device for operating with an electronic ballast, wherein the electronic ballast is arranged to supply a plurality of fluorescent lamps, the tubular lighting device comprising:
   first connection pins (p1, p2) for coupling to a first output of the electronic ballast;
   second connection pins (p3, p4) for coupling to a second output of the electronic ballast;
   a first filament emulation circuit coupled to the first connection pins;
   a second filament emulation circuit coupled to the second connection pins;
   a lighting element;
   a driver coupled to the first filament emulation circuit, the second emulation circuit, a first battery and the lighting element, wherein the driver is arranged to provide a charge to the lighting element and the first battery;
   the first battery for storing the charge provided by the driver and providing the charge to the lighting element;
   a controller comprising a communication device for sending, when the charge of the first mentioned battery is below a first threshold, a first charging signal to a further retrofit tubular lighting device comprising a further battery and being coupled to the electronic ballast, and wherein the communication device is further arranged for receiving a second charging signal from the further retrofit tubular lighting device, wherein the second charging signal indicates that a further charge of the further battery is below a second threshold,
   wherein at least one of the first filament emulation circuit and the second filament emulation circuit is arranged to provide power from the electronic ballast to the driver when the communication device receives the second charging signal indicating that the further charge of the further battery is below the second threshold.

2. The retrofit tubular lighting device according to claim 1 wherein the communication device is further arranged for sending a first discharging signal to the further retrofit tubular lighting device, when the first battery charge is above a third threshold, and wherein the communication device is further arranged for receiving a second discharging signal from the further retrofit tubular lighting device, wherein the second discharging signal indicates that the further charge of the further battery is above a fourth threshold,
   wherein at least one of the first filament emulation circuit and the second filament emulation circuit is arranged to prevent power to be provided from the electronic ballast to the driver when the communication device receives the second discharging signal indicating that the further charge of the further battery is above a fourth threshold, wherein the third threshold is larger than the first threshold and the fourth threshold is larger than the second threshold.

3. The retrofit tubular lighting device according to claim 1 wherein the first filament emulation circuit and the second filament emulation circuit are arranged to:
   block power to flow from the electronic ballast to the driver when the communication device receives the second discharging signal and the first battery charge is above the first threshold,
   provide power from the electronic ballast to the driver when the communication device receives the second charging signal or the first battery charge is below the second threshold.

4. The retrofit tubular lighting device according to claim 3 wherein both the first filament emulation circuit and the second filament emulation circuit comprise at least one switch for blocking the power to flow from the electronic ballast to the driver.

5. The retrofit tubular lighting device according to claim 1 wherein the communication device is a wireless communication device.

6. The retrofit tubular lighting device according to claim 4, wherein the retrofit tubular device further comprises a further switch coupled between the first filament emulation circuit and the second filament emulation circuit, wherein the controller is arranged for opening in a standby mode the further switch to cause the electronic ballast to go into stand-by.

7. The retrofit tubular lighting device according to claim 6, wherein:
   the controller is arranged for opening in a reset mode the switches in both the filament emulation circuits to reset the electronic ballast;
   the controller is arranged for closing in a normal operating mode the switches in both the filament emulation circuits followed by closing the further switch to allow the electronic ballast to provide power to retrofit tubular lighting device.

8. The retrofit tubular lighting device according to claim 1 wherein the lighting element is an LED lighting element.

9. A luminaire comprising:
   an electronic ballast arranged to supply power to a plurality of fluorescent lamps;
   a plurality of retrofit tubular lighting devices according to claim 1, wherein the communication device in one of the retrofit tubular lighting devices is arranged to communicate with a further communication device of a further one of the plurality of tubular lighting devices.

10. A method for operating a retrofit tubular lighting device according to claim 1 comprising the steps of:
    sending a first charging signal when a charge of a first battery is below a first threshold to a further retrofit tubular lighting device comprising a further battery and being coupled to an electronic ballast;
    receiving a second charging signal from the further retrofit tubular lighting device, wherein the second charging signal indicates that a further charge of the further battery is below a second threshold;
    allow power to be provided from the electronic ballast to a driver when a communication device receives the second charging signal indicating that the further charge of the further battery is below the second threshold.

11. The method according to claim 10 wherein the method further comprises the steps of:
    sending a first discharging signal to the further retrofit tubular lighting device when the first battery charge is above a third threshold;

receiving a second discharging signal from the further retrofit tubular lighting device,
wherein the second discharging signal indicates that the further charge of the further battery is above a fourth threshold.

\* \* \* \* \*